(No Model.)

J. W. McNEELY.
TRACTION WHEEL.

No. 279,963. Patented June 26, 1883.

Witnesses
J. Negley Cooke
J. J. Lay

Inventor
John W. McNeely
by James I. Kay
Attorney

UNITED STATES PATENT OFFICE.

JOHN W. McNEELY, OF PITTSBURG, PENNSYLVANIA.

TRACTION-WHEEL.

SPECIFICATION forming part of Letters Patent No. 279,963, dated June 26, 1883.

Application filed October 25, 1882. (No model.)

*To all whom it may concern:*

Be it known that I, JOHN W. MCNEELY, of Pittsburg, in the county of Allegheny and State of Pennsylvania, have invented a new and useful Improvement in Traction-Wheels; and I do hereby declare the following to be a full, clear, and exact description thereof.

My invention relates to the traction-wheels employed in road-engines, steam-plows, and other power machinery adapted to travel on roads or ground, and its object is to obtain a strong traction or hold upon the earth without too great diameter, weight, or breadth of tire. It has special reference to that class of traction-wheels in which the tire is formed sectional, the sectional blocks being mounted in yielding bearings, so as to obtain the traction of two or more of these blocks.

It consists, essentially, in a traction-wheel having a tire formed of sectional blocks, in combination with an outer tire, formed of rubber or like flexible material, fitting around the segmental tire, so as to increase the traction by giving a hold on the ground between the blocks, and to hold the segmental blocks in proper position.

It also consists in certain improvements in the means for cushioning the segmental blocks and in the manner of mounting them on the wheel.

To enable others skilled in the art to make and use my invention, I will describe its construction and operation, referring to the accompanying drawings, forming part of this specification, in which—

Figure 1:
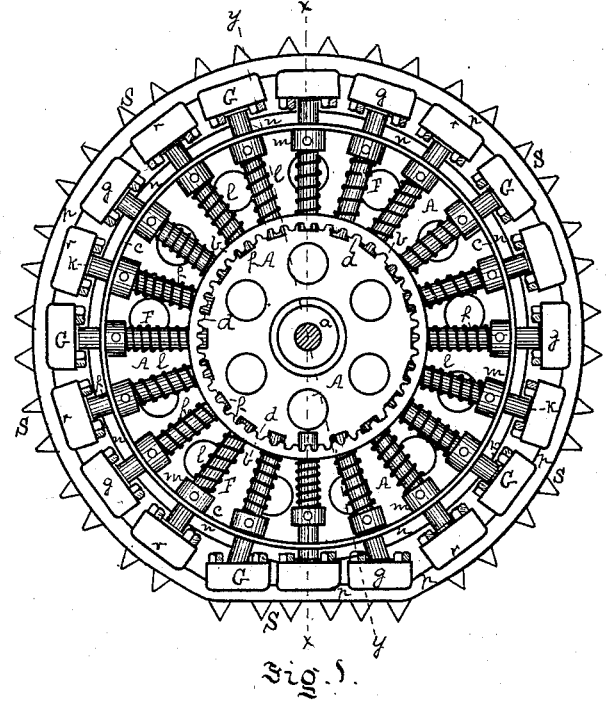
Figures 2, 3:
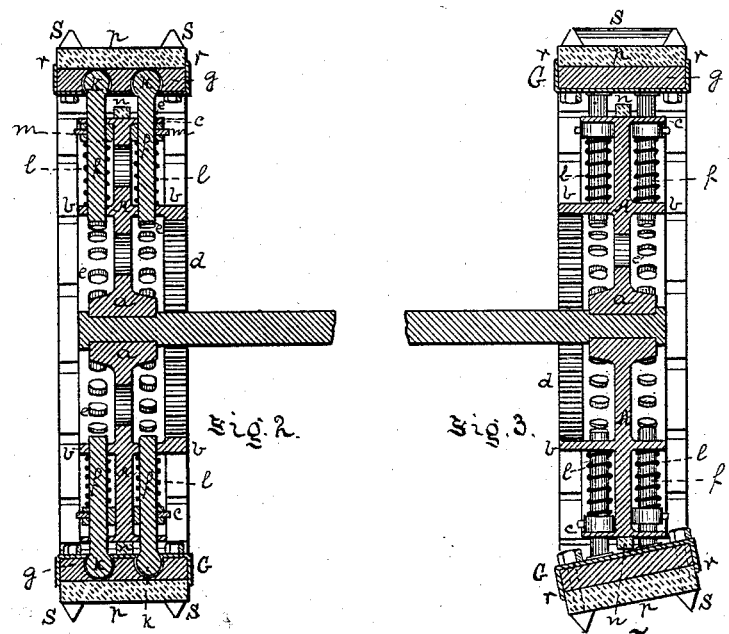

Figure 1 is a side view of my improved traction-wheel. Fig. 2 is a section on the line $x$ $x$, Fig. 1, and Fig. 3 is a section on the line $y$ $y$, Fig. 1.

Like letters of reference indicate like parts in each.

In the drawings, A represents the frame of my improved traction-wheel, which is formed of cast iron or steel, and has the hub $a$ for the reception of the axle, and the annular flange $b$ and rim $c$, in which the arms or bars of the blocks forming the segmental tire are journaled. The flange $b$ and rim $c$ extend out on either side of the frame A, and the inner face of the flange $b$ is provided with teeth or cogs $d$ on one side of the frame A, into which a cog-wheel operated by the engine supported on the traction-wheels gears, thus applying power to the wheels. The flange $b$ and rim $c$ have holes $e$ extending through them in lines radial from the center of the wheel, in which the arms or bars of the yielding bearings F slide, these supporting the blocks $g$ of the segmental tire G. The wheel shown has two of the arms $f$ to each block, though four of these arms may be employed, if so desired. The blocks $g$ are supported at the ends of these bearings F by means of flexible joints K, the joints shown being what are termed "ball-and-socket joints," though any other joint may be employed which permits the free movement of the block on the ends of the bars. On each arm or bar, between the flange $b$ and rim $c$, is the coil or like spring $l$, one end of which rests against the outer face of the flange $b$, while the other end presses against a collar, $m$, rigidly secured to the bar between the spring and the inner face of the rim $c$, the bars being so mounted in the bearings to form the yielding bearings F for the blocks $g$, and permitting the blocks to yield when the weight of the engine and wheel comes upon them. The collars $m$ on the bars limit the throw of the springs and cause them to hold the blocks in proper position when not sustaining the weight of the engine or wheel. To form a cushion between the blocks $g$ and the outer face of the rim $c$, I secure around the rim above the frame A the heavy rubber ring or cushion $n$, against which the back of the blocks will be pressed, thus preventing injury to the rim or frame by jar or concussion. The faces of the blocks $g$ of the segmental tire are formed flat, so as to bear with their entire face upon the outer flexible tire, $p$; and to increase the hold or traction, the tire $p$ may be provided with spikes or cleats of suitable form and size to enter the ground. The outer tire, $p$, is employed to increase the traction, as it gives a hold on the ground between the segmental blocks, and also because it prevents the entrance of stones and dirt between the blocks and the consequent clogging of the wheels. The outer tire, $p$, fits around the segmental tire G, within flanges $r$, extending from either side of the block about half-way over the edges of the tire. The tire is made of a thick rubber, leather, or like belt, which is sufficiently flexible to yield and conform itself to the movements of the yielding segmental tire G. The spikes or cleats s on the outer face of the tire may either be secured to the tire p independently of the block g, or the fastening bolts, may pass through both tire and blocks, and thus secure the outer tire to the blocks, as shown.

The operation of my improved traction-wheel is as follows: The wheel is employed in the same manner as the ordinary wheels, the boiler, engine, and machinery being generally supported on two of these wheels and the guide wheel or wheels. Power from the engine is communicated to the wheels through a cog-wheel working in the teeth or cogs d, and as the wheels are turned the weight of the engine and wheels is thrown on the blocks g of the segmental tire at the base of the wheel. The weight presses back these blocks until the faces of two or more blocks are parallel with the ground, the blocks conforming to the surface of the ground by means of the yielding bearings and flexible joints, thus giving traction circumferentially of the wheel for the width of the faces of the blocks, the traction being from one-tenth to one-seventh of the circumference of the wheel shown. The traction is further increased by the outer rubber tire pressed for this distance on the ground, as it gives a stronger hold than obtained by a metal face and extends the pressure or traction across the space between the blocks of the segmental tire. It is also further increased by the spikes or cleats on the periphery of the tire, as all of them below the blocks pressed back are pressed for their entire length into and obtain a hold on the ground. As the wheels are turned farther round by the cog-wheel the other blocks of the segmental tires receive the weight of the engines and wheels and act in the manner above described, and when they are relieved of the pressure the springs l on the arms f throw them out into their normal positions, so that they hold the outer tire in place, even when not attached thereto. In case the wheels pass over ruts or rough or sloping ground, the blocks, by means of their flexible joints K and the outer flexible tire, conform themselves to the ground, as shown in Fig. 3, so that the wheels lose no traction on this account. The cushion n between the segmental tire and rim c of the frame cushions the blocks when pressed back, and when bent on an angle in passing over rough or sloping ground, and prevents any jar or concussion to the wheel-frame or engine.

I thus form wheels by which the traction circumferentially of the wheels is materially increased, and the same power can be obtained with smaller, narrower, and lighter wheels, and wheels by which the same traction can be obtained on rough or sloping ground as on smooth and level roads.

What I claim as my invention, and desire to secure by Letters Patent, is—

1. A traction-wheel having a tire formed of segmental blocks mounted in yielding bearings, in combination with an outer tire, formed of rubber or like flexible material, fitting around said segmental tire, substantially as and for the purposes set forth.

2. In traction-wheels, the combination of the wheel-frame A, having the flange b and rim c, with the segmental blocks g and yielding bearings F, substantially as and for the purposes set forth.

3. In traction-wheels, the combination of the wheel-frame A, having the flanges b and rim c, the segmental blocks g, the arms f, connected thereto by the flexible joints k, the collars m, and the springs l around said arms and between the collars and flanges, substantially as and for the purposes set forth.

4. In traction-wheels, the combination of the wheel-frame A, having the flanges b and rim c, segmental blocks g, arms f, connected thereto by flexible joints k, and extending through said rim and flanges, collars m, spring l around said arms, and cushion n between the blocks g and rim c, substantially as and for the purposes set forth.

5. In traction-wheels, the combination of the outer flexible tire and inner segmental tire, formed of blocks mounted in yielding bearings, and having flanges extending over the edges of the outer tire, substantially as and for the purposes set forth.

6. In traction-wheels, the combination of an inner segmental yielding tire, G, and outer flexible tire, p, and spikes or cleats s, secured on the outer face of the tire p, substantially as and for the purposes set forth.

In testimony whereof I, the said JOHN W. McNEELY, have hereunto set my hand.

JOHN W. McNEELY.

Witnesses:
J. NEGLEY COOKE,
JAMES I. KAY.